US011861310B1

(12) United States Patent
Flor et al.

(10) Patent No.: US 11,861,310 B1
(45) Date of Patent: Jan. 2, 2024

(54) LEXICAL CONCRETENESS IN NARRATIVE TEXT

(71) Applicant: Educational Testing Service, Princeton, NJ (US)

(72) Inventors: Michael Flor, Lawrence Township, NJ (US); Swapna Somasundaran, Plainsboro, NJ (US)

(73) Assignee: Educational Testing Service, Princeton, NJ (US)

( * ) Notice: Subject to any disclaimer, the term of this patent is extended or adjusted under 35 U.S.C. 154(b) by 179 days.

(21) Appl. No.: 16/857,327

(22) Filed: Apr. 24, 2020

Related U.S. Application Data

(60) Provisional application No. 62/838,557, filed on Apr. 25, 2019.

(51) Int. Cl.
*G06F 40/284* (2020.01)
*G06F 40/253* (2020.01)

(52) U.S. Cl.
CPC .......... *G06F 40/284* (2020.01); *G06F 40/253* (2020.01)

(58) Field of Classification Search
None
See application file for complete search history.

(56) References Cited

U.S. PATENT DOCUMENTS

| 2015/0248397 | A1* | 9/2015 | Burstein ................. G06F 40/35 704/9 |
| 2015/0254565 | A1* | 9/2015 | Beigman Klebanov ..................... G06N 7/005 706/12 |
| 2017/0140043 | A1* | 5/2017 | Apte .................. G06Q 10/0639 |
| 2019/0087414 | A1* | 3/2019 | Narayanan ............ G06F 16/313 |
| 2019/0197128 | A1* | 6/2019 | Martinez Iraola .. G06F 16/3344 |
| 2020/0218778 | A1* | 7/2020 | Abuelsaad ............ G06F 16/538 |
| 2021/0330241 | A1* | 10/2021 | de Vries ................. A61B 5/741 |

OTHER PUBLICATIONS

Brysbaert, Marc, Amy Beth Warriner, and Victor Kuperman. "Concreteness ratings for 40 thousand generally known English word lemmas." Behavior research methods 46, No. 3 (2014): 904-911. (Year: 2014).*

Kehat, Gitit, and James Pustejovsky. "Integrating vision and language datasets to measure word concreteness." In Proceedings of the Eighth International Joint Conference on Natural Language Processing (vol. 2: Short Papers), pp. 103-108. 2017. (Year: 2017).*

(Continued)

*Primary Examiner* — Frank D Mills
(74) *Attorney, Agent, or Firm* — Jones Day

(57) ABSTRACT

A computer-implemented technique for characterizing lexical concreteness in narrative includes receiving data encapsulating narrative text having a plurality of words. Thereafter, the function words can be removed from the narrative text to result in only content words. A concreteness score can then be assigned to each content word by polling a database to identify matching words and to use concreteness scores associated with such matching words as specified by the database. Data can then be provided which characterizes the assigned concreteness scores. Related apparatus, systems, techniques and articles are also described.

6 Claims, 2 Drawing Sheets

(56) References Cited

OTHER PUBLICATIONS

Xu, Weifeng, Dianxiang Xu, and Lin Deng. "Measurement of source code readability using word concreteness and memory retention of variable names." In 2017 IEEE 41st Annual Computer Software and Applications Conference (COMPSAC), vol. 1, pp. 33-38. IEEE, 2017. (Year: 2017).*

Brysbaert et al. "Concreteness ratings for 40 thousand generally known English word lemmas." Behavior research methods 46, No. 3 (2014): 904-911; Supplementary Material from https://static-content.springer.com/esm/art%3A10.3758%2Fs13428-013-0403-5/MediaObjects/13428_2013_403_MOESM1_ESM.xlsx, p. 1-851 (Year: 2014).*

Crutch, Sebastian J. "Qualitatively different semantic representations for abstract and concrete words: Further evidence from the semantic reading errors of deep dyslexic patients." Neurocase 12, No. 2 (2006): 91-97. (Year: 2006).*

Tanaka, Shinya, Adam Jatowt, Makoto P. Kato, and Katsumi Tanaka. "Estimating content concreteness for finding comprehensible documents." In Proceedings of the sixth ACM international conference on Web search and data mining, pp. 475-484. 2013. (Year: 2013).*

Louis, Annie, and Ani Nenkova. "Text specificity and impact on quality of news summaries." In Proceedings of the Workshop on Monolingual Text-to-Text Generation, pp. 34-42. 2011. (Year: 2011).*

Evans, James; Straightforward Statistics for the Behavioral Sciences; Brooks/Cole Publishing Co.: Pacific Grove, CA; 1996.

Hacker, Diana, Sommers, Nancy; The Bedford Handbook, 9th Ed.; Bedford/St. Martins: Boston, MA; 2014.

Strunk, Jr., William, Tenney, Edward; The Elements of Style, 4th Ed.; Pearson: Harlow, UK; 1999.

Paivio, Allan; Imagery and Verbal Processes; Holt, Rinehart & Winston: Oxford, UK; 1971.

Berman, Ruth, Nir-Sagiv, Bracha; Comparing Narrative and Expository Text Construction Across Adolescence: A Developmental Paradox; Discourse Processes, 43(2); pp. 79-120; Dec. 2007.

Brysbaert, Marc, Warriner, Amy Beth, Kuperman, Victor; Concreteness Ratings for 40 Thousand Generally Known English Word Lemmas; Behavior Research Methods, 46(3); pp. 904-911; Sep. 2014.

Coltheart, Max; The MRC Psycholinguistic Database; Quarterly Journal of Experimental Psychology, 33A; pp. 497-505; 1981.

Goth, Julius, Baikadi, Alok, Ha, Eun, Rowe, Jonathan, Mott, Bradford, Lester, James; Exploring Individual Differences in Student Writing with a Narrative Composition Support Environment; Proceedings of the NAACL HLT 2010 Workshop on Computational Linguistics and Writing; Los Angeles, CA; pp. 56-64; Jun. 2010.

Graesser, Arthur, McNamara, Danielle, Louwerse, Max, CAI, Zhiqiang; Coh-Metrix: Analysis of Text on Cohesion and Language; Behavioral Research, Methods, Instruments and Computers, 36(2); pp. 193-202; 2004.

Li, Junyi Jessy, Nenkova, Ani; Fast and Accurate Prediction of Sentence Specificity; Proceedings of the 29th AAAI Conference on Artificial Intelligence; pp. 2381-2387; 2015.

Longobardi, Emiddia, Spataro, Pietro, Renna, Marialuisa, Rossi-Arnaud, Clelia; Comparing Fictional, Persona, and Hypothetical Narratives in Primary School: Story Grammar and Mental State Language; European Journal of Psychology of Education, 29; pp. 257-275; 2014.

Louis, Annie, Nenkova, Ani; Automatic Identification of General and Specific Sentences by Leveraging Discourse Annotations; Proceedings of the 5th International Joint Conference on Natural Language Processing; Chiang Mai, Thailand; pp. 605-613; Nov. 2011.

Louis, Annie, Nenkova, Ani; What Makes Writing Great? First Experiments on Article Quality Prediction in the Science Journalism Domain; Transactions of the Association for Computational Linguistics, 1; pp. 341-352; 2013.

Lugini, Luca, Litman, Diane; Predicting Specificity in Classroom Discussion; Proceedings of the 12th Workshop on Innovative Use of NLP for Building Educational Applications; Copenhagen, Denmark; pp. 52-61; Sep. 2017.

Maguire, John; The Secret to Good Writing: It's About Objects, Not Ideas; The Atlantic; Oct. 2012.

Matson, Owen; Why Concrete Language is Essential to Engaging Content; https://info.marketscale.com/blog; 2017.

Paivio, Allan; Dual Coding Theory, Word Abstractness, and Emotion: A Critical Review of Kousta et al. (2011); Journal of Experimental Psychology: General, 142(1); pp. 282-287; Feb. 2013.

Ravid, Dorit; Emergence of Linguistic Complexity in Later Language Development: Evidence from Expository Text Construction; Perspectives on Language and Language Development: Essays in Honor of Ruth A. Berman; pp. 337-355, Jan. 2005.

Sadoski, Mark; Resolving the Effects of Concreteness on Interest, Comprehension, and Learning Important Ideas From Text; Educational Psychology Review, 13(3); pp. 263-281; 2001.

Sadoski, Mark, Goetz, Ernest, Fritz, Joyce; Impact of Concreteness on Comprehensibility, Interest, and Memory for Text: Implications for Dual Coding Theory and Text Design; Journal of Educational Psychology, 85(2); pp. 291-304; 1993.

Sadoski, Mark, Goetz, Ernest, Rodriguez, Maximo; Engaging Texts: Effects of Concreteness on Comprehensibility, Interest, and Recall in Four Text Types; Journal of Educational Psychology, 92(1); pp. 85-95; 2000.

Smarter Balanced; English Language Arts Item and Task Specifications; Apr. 2012.

Smarter Balanced; Scoring Guide For Grades 3, 6, and 11 English/Language Arts Performance Task Full-Write Baseline Sets; Nov. 2014.

Somasundaran, Swapna, Flor, Michael, Chodorow, Martin, Molloy, Hillary, Gyawali, Binod, McCulla, Laura; Towards Evaluating Narrative Quality in Student Writing; Transactions of the Association for Computational Linguistics, 6; pp. 91-106; 2018.

Sun, Lei, Nippold, Marilyn; Narrative Writing in Children and Adolescents: Examining the Literate Lexicon; anguage, Speech, and Hearing Services in Schools, 43(1); pp. 2-13; Jan. 2012.

* cited by examiner

LEXICAL CONCRETENESS IN NARRATIVE TEXT

RELATED APPLICATION

The current subject matter claims priority to U.S. patent application Ser. No. 62/838,557 filed on Apr. 25, 2019, the contents of which are hereby fully incorporated by reference.

TECHNICAL FIELD

The subject matter described herein relates to computer-implemented techniques for characterizing lexical concreteness in narrative text.

BACKGROUND

The influential writing-style guide, The Elements of Style (1999), (a.k.a. Strunk and White), recommends writers to 'prefer the specific to the general, the definite to the vague, the concrete to the abstract.' This guidance involves two related but distinct notions, two different senses of the word 'concrete'—tangible and specific. Tangibility, or the concreteness/abstractness continuum relates to objects and properties that afford sensory perception—tangible things that can be seen, heard, smelled and touched. The specificity notion relates to the amount and level of detail that is conveyed in a story, to what extent things are presented in specific rather than general terms. The two notions go hand in hand, because to provide specific details the writer often has to mention more concrete objects and attributes and use less abstract terms. There are exceptions. Emotions and states of mind are usually not concrete (i.e. tangible) entities, though they are often specific. Numerical quantities (e.g. 6 million dollars, 30% of the population) are quite specific but not quite sensorially concrete. Still, the importance of both concreteness and specificity for good writing is well accepted.

SUMMARY

In a first aspect, a computer-implemented technique for characterizing lexical concreteness in narrative includes receiving data encapsulating narrative text having a plurality of words. Thereafter, the function words can be removed from the narrative text to result in only content words. A concreteness score can then be assigned to each content word by polling a database to identify matching words and to use concreteness scores associated with such matching words as specified by the database. Data can then be provided which characterizes the assigned concreteness scores.

In some variations, all of the concreteness scores can be aggregated to result in an overall concreteness score. In addition or in the alternative, concreteness scores can be aggregated for each part-of-speech among the content words to result in an overall concreteness score for each part-of-speech.

The content words can be filtered to result in only nouns, verbs, adjective, and adverbs prior to the tagging.

The polling further can include checking a concreteness score for a lemma or an inflectional variant of a content word in the database if there is not an exact in the database.

A default concreteness score can be assigned to each content word other than a personal name not having a match in the database.

The provision of the data can take various forms including: causing the data characterizing the assignment concreteness scores to be displayed in an electronic visual display, transmitting the data characterizing the assignment concreteness scores to a remote computing device, loading the data characterizing the assignment concreteness scores into memory, and/or storing the data characterizing the assignment concreteness scores into physical persistence.

In another interrelated aspect, a computer-based technique for characterizing lexical concreteness in narrative text includes receiving data encapsulating narrative text having a plurality of words. Thereafter, function words are removed from the narrative text to result in only content words. Each content word is then tagged with a corresponding part-of-speech (POS). A concreteness score is then assigned to each content word by polling a database to identify matching words and POS and to use concreteness scores associated with such matching words and POS as specified by the database. Data is then provided which characterizes the assigned concreteness scores.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for characterization of lexical concreteness in narrative essay responses allowing for automated scoring of such responses thereby utilizing fewer resources (e.g., CPU, memory, I/O, etc.).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
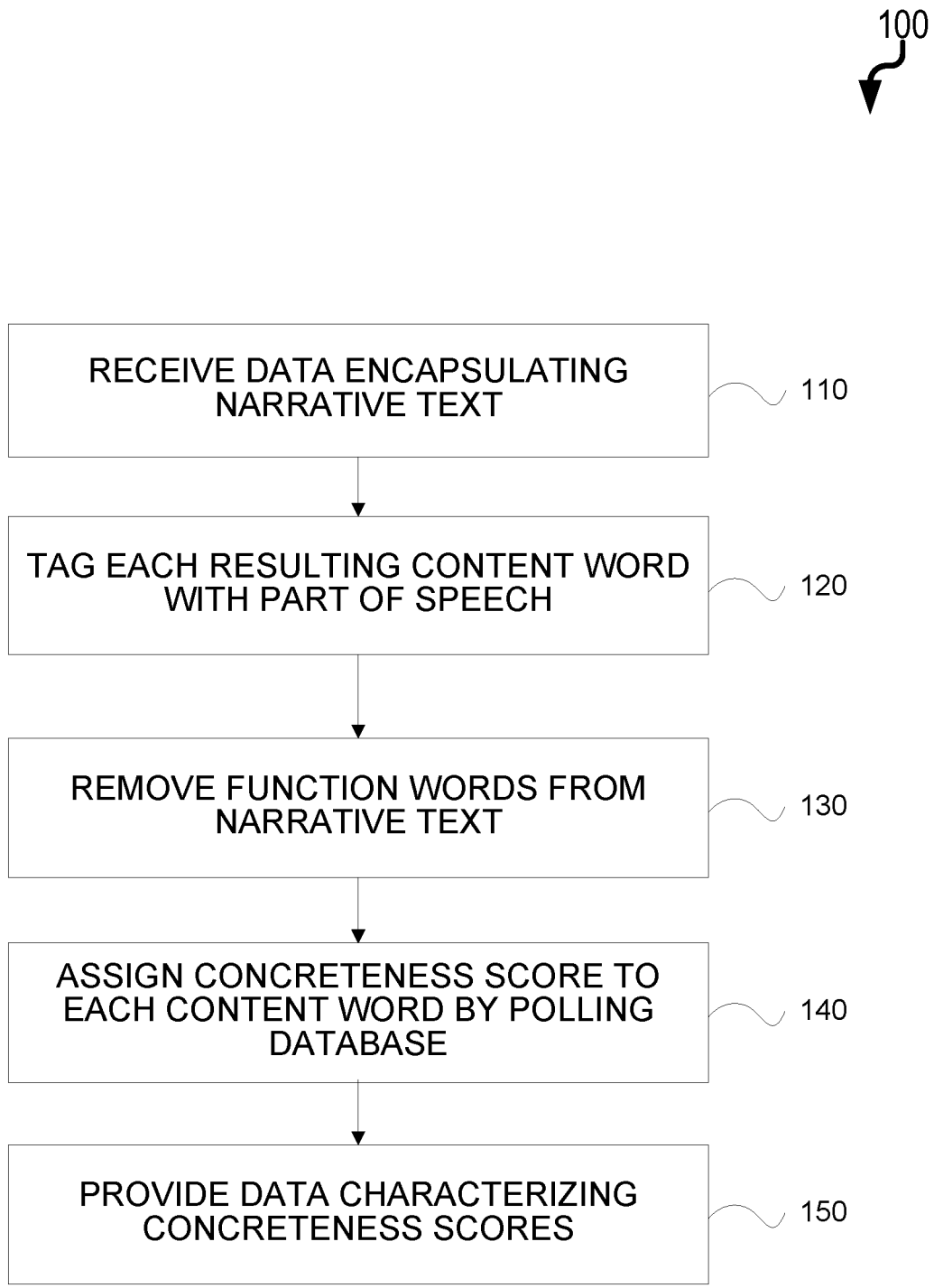
FIG. 1 is a process flow diagram for characterizing lexical concreteness in narrative.

The current subject matter is directed to advanced, computer-implemented techniques for characterizing lexical concreteness in narrative essay responses (i.e. situations when human writers write short stories; for example, without limitation, as school writing assignments). With the current subject matter, a quantitative measure is provided that utilizes per-word concreteness ratings. The current subject matter is informed by an investigation to determine whether better stories are more concrete and whether the story type (e.g. hypothetical situation versus personal narratives) influences the concreteness trends. In addition, in connection with the current subject matter, a fine-grained analysis by parts-of-speech (nouns, verbs, adjectives and adverbs) was performed to explore how their concreteness varies with story quality.

As part of the investigation efforts used herein, a corpus of narrative essays 940 narrative essays written by school students from grade levels 7-12 was utilized. Each essay was written in response to one of 18 story-telling prompts. The total size of the corpus was 310K words with an average essay length of 330 words.

The writing prompts were classified according to the type of story they are calling for, using the three-fold schema from Longobardi et al. (2013)—Fictional, Hypothetical and Personal. Table 1 presents the prompt titles, story types and essay counts.

TABLE 1

Essay counts for 18 prompts and their text-type classifications.

| Prompt | Count essays | Text Type |
|---|---|---|
| A Fork in the Road | 47 | Fictional |
| At First Glance | 69 | Fictional |
| Finding Your Way Home | 2 | Fictional |
| Message in a Bottle | 31 | Fictional |
| Movie Sequel | 12 | Fictional |
| Pitch Session | 6 | Fictional |
| Special Object | 37 | Fictional |
| The Antique Trunk | 8 | Fictional |
| The Quest | 6 | Fictional |
| Different Country | 47 | Hypothetical |
| Electricity-Free | 32 | Hypothetical |
| Living Art | 3 | Hypothetical |
| Trading Places | 22 | Hypothetical |
| Weirdest Day Ever! | 78 | Hypothetical |
| You are the Teacher | 121 | Hypothetical |
| Travel | 75 | Personal |
| Memorable School Day | 153 | Personal |
| Proudest Moment | 191 | Personal |
| Totals | 171 | Fictional |
|  | 303 | Hypothetical |
|  | 466 | Personal |

Data
Essay Scores
  Example prompts for three types of text styles:
  Personal Experience: "Proudest Moment"—There are moments in everyone's lives when they feel pride and accomplishment after completing a challenging task. Write a story about your proudest moment.
  Hypothetical Situation: "You are the Teacher"—Pretend that one morning you wake up and find out that you've become your teacher for a day! What happened? What do you do? Do you learn anything? Write a story about what happens. Use your imagination!
  Fictional Story: "Message in a Bottle"—Throughout the years, many have placed messages in sealed bottles and dropped the bottles into the ocean where they eventually washed up on foreign shores. Occasionally the finder has even contacted the sender. Write a story about finding your own message in a bottle.

For training purposes, all essays in the corpus were manually scored by experienced research assistants using a rubric that was created by education experts and teachers, and presented by Smarter Balanced assessment consortium, an assessment aligned to U.S. State Standards for grades K-12 (Smarter Balanced, 2014b,a).

The essays were scored along three traits (dimensions): Organization, Development and Conventions. Organization is concerned with event coherence, whether the story has a coherent start and ending, and whether there is a plot to hold all the pieces of the story together. It is scored on a scale of 0-4 integer points. Development evaluates whether the story provides vivid descriptions, and whether there is character development. It is also scored on a scale of 0-4 integer points, with 4 being the highest score. The Conventions dimension evaluates language proficiency, and is concerned with aspects of grammar, mechanics, and punctuation. Scores are on a scale of 0-3 integer points (3 is the highest score).

In addition, Narrative and Total composite scores were computed for each essay. The Narrative score (range 0-8) is the sum of Organization and Development scores. Total score (range 0-11) is the sum of Organization, Development and Conventions. Not surprisingly, the Organization, Development, Narrative and Total scores are highly intercorrelated. With the current subject matter, the Narrative scores were used thereby focusing on essay narrative quality and de-emphasizing grammar and mechanics.

With the current subject matter, the focus can be on calculating concreteness of only the content words in the essays while ignoring all function words. Each essay in the corpus was tagged for parts of speech (POS) using the Apache OpenNLP tagger, and further analysis filtered in only nouns, verbs, adjectives and adverbs. Those content words were checked against the database of concreteness scores. The database provides real-valued ratings in the 1-5 range, from very abstract (score 1.0) to very concrete (score 5.0). For words that were not matched in the database, it was checked if the lemma or an inflectional variant of the word was present in the database (using a morphological toolkit). The database does not include names, but the essays often include names of persons and places. For the scoring of concreteness, any names (identified by POS-tags NNP or NNPS), that were not found in the database, were assigned a uniform concreteness score of 4.0.

Concreteness scores were accumulated for all relevant words for each essay as described above. Average and median concreteness score was computed for each essay, separately for each of the categories (nouns, verbs, adjective and adverbs), and also jointly for all content-words. The total numbers of content words are given in Table 2. The concreteness-ratings coverage for our data is 97.8%.

TABLE 2

Content word counts by part-of-speech, with counts and proportion of tokens that did not have concreteness scores, for 940 essays.

| POS | Count | Missing values |
|---|---|---|
| nouns | 64,374 | 2,113 (3.3%) |
| verbs | 66,718 | 753 (1.1%) |
| adjectives | 19,090 | 658 (3.45%) |
| adverbs | 19,399 | 212 (1.1%) |
| all content words | 169,581 | 3,736 (2.2%) |

Pearson correlations of essay scores with per-essay levels of concreteness are presented in Table 3. Overall, the correlation of average-concreteness with essay score is r=0.222, which is considered a weak correlation. Breakdown by parts of speech shows that adjectives have the highest correlation of concreteness with score (0.297), followed by that for nouns (0.251), and adverbs (0.231). The correlation is weakest for verbs, only 0.122. Results for median-concreteness per essay show a similar pattern, though nouns now overtake adjectives.

TABLE 3

Pearson correlations of essay narrative scores with per-essay levels of concreteness, for 940 essays.

|  | Average C. | Median C. |
| --- | --- | --- |
| nouns | 0.251 | 0.284 |
| verbs | 0.122 | 0.113 |
| adjectives | 0.297 | 0.242 |
| adverbs | 0.231 | 0.132 |
| all content words | 0.222 | 0.188 |

All correlations are significant, p <. 001. C. = concreteness score

Table 4A below presents the correlations of concreteness levels with essay scores for each of the six prompts that have more than 50 essays. For two of the prompts, Travel and At First Glance, average concreteness of nouns is moderately correlated with essay narrative score (r=0.4). For four prompts, adjectives show weak correlation with essay scores (from 0.21 to 0.35), while for the Travel prompt, average concreteness of adjectives is moderately correlated with essay narrative score (r=0.4). For four prompts, the average concreteness of adverbs is weakly correlated with essay score (0.24 to 0.33). For verbs, only one prompt, Weirdest Day Ever shows some correlation of concreteness with essay score (0.33).

|  | N | Nouns | Verbs | Adjectives | Adverbs | All CW |
| --- | --- | --- | --- | --- | --- | --- |
| (A) Prompt | | | | | | |
| Travel | 75 | 0.400** | −0.017 | 0.401** | 0.268* | 0.371** |
| At First Glance | 69 | 0.404** | 0.006 | 0.326** | 0.286* | 0.240† |
| Memorable School Day | 153 | 0.080 | 0.040 | 0.212** | 0.239** | 0.089 |
| Proudest Moment | 191 | 0.207** | 0.072 | 0.118 | 0.060 | 0.137 |
| Weirdest Day Ever | 78 | 0.125 | 0.326** | 0.355** | 0.330** | 0.322** |
| You are the Teacher | 121 | 0.218* | 0.102 | 0.298** | 0.131 | 0.071 |
| (B) Story type | | | | | | |
| Fictional | 171 | 0.465** | 0.164† | 0.417** | 0.384** | 0.413** |
| Hypothetical | 303 | 0.263** | 0.222** | 0.287** | 0.143* | 0.217** |
| Personal | 466 | 0.199** | 0.045 | 0.237** | 0.209** | 0.138** |

Tables 4(A), 4(B): Pearson correlations of essay narrative scores with per-essay average levels of concreteness;
(A) for prompts that have above 60 essays,
(B) for all essays, grouped by story-type.
Significance of correlation **: p < 0.01, *: p < .03, †: p < .05.
CW = content words.

Table 4B above shows the results of grouping essays by three types of story that their prompts were classified into (which allows the data from all essays to be used). The Fictional story type has the highest correlation of concreteness and essay score (r=0.413), and it also has the highest correlation for nouns, for adjectives and for adverbs (as compared to other story types). Stories of the Hypothetical type show weak (yet significant) correlation of concreteness with scores, for nouns, verbs, adjectives and overall. Interestingly, the Personal story type shows the least relation of concreteness to scores, 0.138 overall; the adjectives there have correlation of 0.237, adverbs 0.209, and the nouns barely reach 0.2.

The results above suggest that the relation of concreteness to essay score varies for different story types. The essays from three story types were also checked to confirm whether they differ in concreteness or quality. An analysis of variance of narrative scores for three groups, F(2,937)=1.427, p=0.241, reveals that they did not differ in the average quality of stories. The average per-essay concreteness was also compared for the three groups. Mean concreteness for Fiction essays is 2.91, for Hypothetical essays it is 2.99, and 2.90 for Personal. An analysis of variance, F(2,937)=19.774, p<0.0001, shows that average concreteness is not equal in those groups. Post hoc comparisons indicated that only the Hypothetical group differed significantly from the two other groups. Those results indicate that the different strength of correlation between lexical concreteness and essay score that we observe in the three groups is not due to between-group differences in either narrative scores or lexical concreteness.

As will be appreciated, the current subject matter provides novel computer-implemented methodologies for calculating per-text lexical concreteness scores. For student-written stories, lexical concreteness is weakly to moderately positively correlated with narrative quality. Better essays score higher on lexical concreteness and use relatively less abstract words. While those results support the old adage 'prefer the concrete to the abstract', it was also found that this relation varies for different story-types. It is prominent for Fictional stories, less pronounced for Hypothetical stories, and rather weak for Personal stories. Nouns and adjectives carry this relation most prominently, but it is also found for adverbs and verbs.

FIG. 1 is a process flow diagram 100 for characterizing lexical concreteness in narrative text in which, at 110, data is received that encapsulates narrative text having a plurality of words. Words of the text can be optionally tagged, at 120, with a corresponding part-of-speech (POS). Thereafter, at 130, function words are removed from the narrative text to result in only content words. A concreteness score is then assigned, at 140, to each content word. Such assigning can include polling a database to identify matching words and using concreteness scores associated with such matching words as specified by the database. Data characterizing the assigned concreteness scores can, at 150, be provided (e.g., displayed, transmitted, stored in disk, loaded into memory, etc.).

Figure 2:
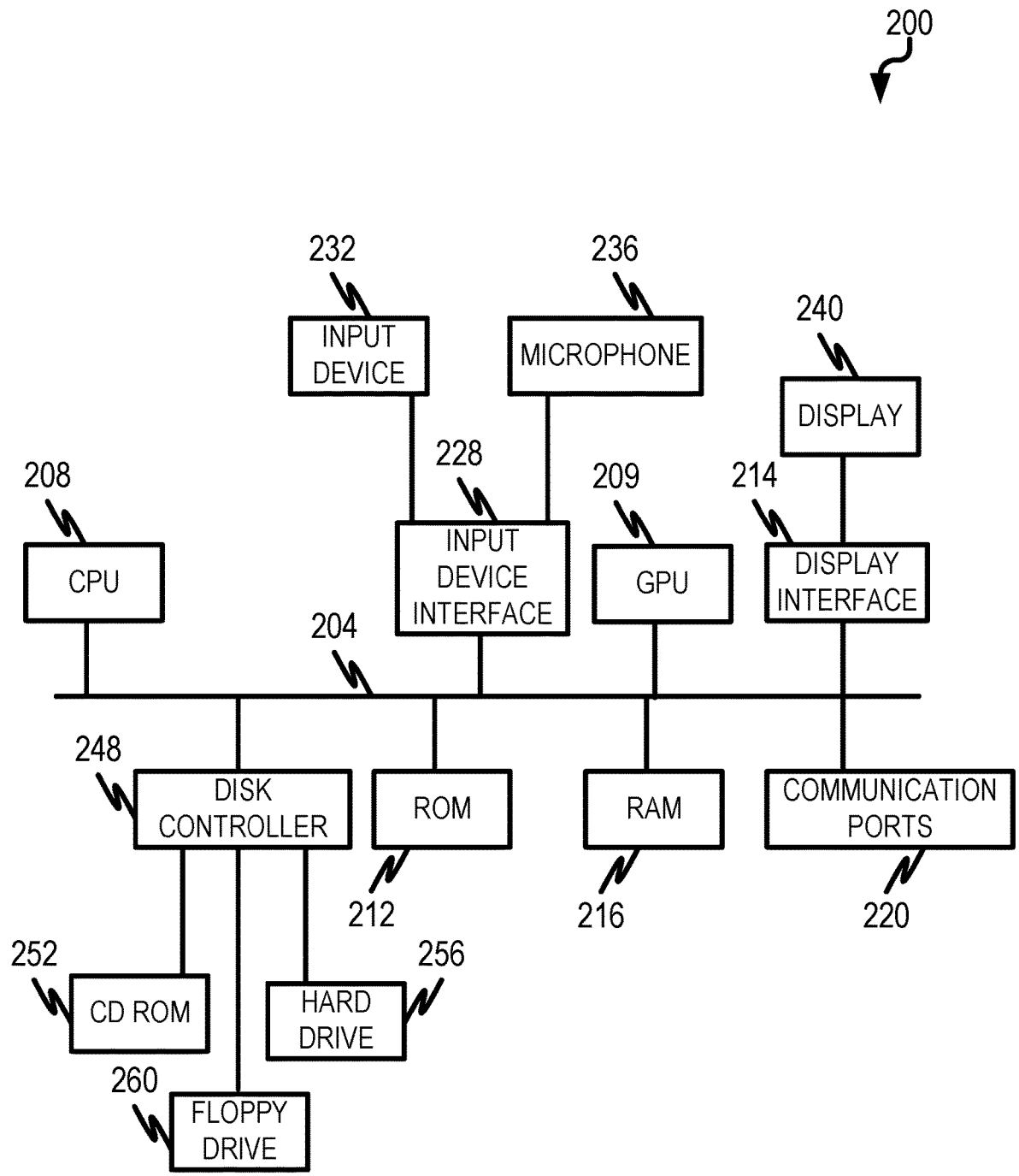
FIG. 2 is a diagram illustrating a computing device for implementing aspects of the current subject matter.

FIG. 2 is a diagram 200 illustrating a sample computing device architecture for implementing various aspects described herein. A bus 204 can serve as the information highway interconnecting the other illustrated components of the hardware. A processing system 208 labeled CPU (central processing unit) (e.g., one or more computer processors/data processors at a given computer or at multiple computers), can perform calculations and logic operations required to execute a program. A non-transitory processor-readable storage medium, such as read only memory (ROM) 212 and random access memory (RAM) 216, can be in communication with the processing system 208 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 248 can interface with one or more optional disk drives to the system bus 204. These disk drives can be external or internal floppy disk drives such as 260, external or internal CD-ROM, CD-R, CD-RW or DVD, or solid state drives such as 252, or external or internal hard drives 256. As indicated previously, these various disk drives 252, 256, 260 and disk controllers are optional devices. The system bus 204 can also include at least one communication port 220 to allow for communication with external devices either physically connected to the computing system or available externally through a wired or wireless network. In some cases, the at least one communication port 220 includes or otherwise comprises a network interface.

To provide for interaction with a user, the subject matter described herein can be implemented on a computing device having a display device 240 (e.g., a CRT (cathode ray tube) or LCD (liquid crystal display) monitor) for displaying information obtained from the bus 204 via a display interface 214 to the user and an input device 232 such as keyboard and/or a pointing device (e.g., a mouse or a trackball) and/or a touchscreen by which the user can provide input to the computer. Other kinds of input devices 232 can be used to provide for interaction with a user as well; for example, feedback provided to the user can be any form of sensory feedback (e.g., visual feedback, auditory feedback by way of a microphone 236, or tactile feedback); and input from the user can be received in any form, including acoustic, speech, or tactile input. The input device 232 and the microphone 236 can be coupled to and convey information via the bus 204 by way of an input device interface 228. Other computing devices, such as dedicated servers, can omit one or more of the display 240 and display interface 214, the input device 232, the microphone 236, and input device interface 228.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for characterizing lexical concreteness in narrative text, the method being implemented by one or more data processors and comprising:
   receiving data encapsulating narrative text having a plurality of words generated by a student in response to a prompt;
   removing function words from the narrative text to result in only content words;
   tagging each content word with a corresponding part-of-speech (POS) by a machine learning-based toolkit for processing of natural language text;
   filtering the content words to result in only nouns, verbs, adjective, and adverbs;
   first assigning, after the filtering, a concreteness score to each content word within a database by polling the database over a computer network to identify matching words and to use concreteness scores associated with such matching words as specified by the database;
   second assigning a uniform concreteness score for all content words corresponding to a name and not having a match in the database, the default concreteness score being a value other than zero;
   first generating concreteness scores for each of nouns, verbs, adjective, and adverbs based on the first and second assigning;
   second generating an overall concreteness score based on the first and second assigning; and
   providing data characterizing the generated concreteness scores for each of nouns, verbs, adjective, and adverbs and the overall concreteness score, the providing data comprising one or more of:
      causing the data characterizing the generated concreteness scores to be displayed in an electronic visual display, transmitting the data characterizing the generated concreteness scores to a remote computing device, loading the data characterizing the generated concreteness scores into memory, or storing the data characterizing the generated concreteness scores into physical persistence.

2. The method of claim 1, wherein the polling further comprises:
checking, using a computer-based morphological toolkit, a concreteness score for a lemma or an inflectional variant of a content word in the database if there is not an exact in the database.

3. A system method for characterizing lexical concreteness in narrative text comprising:
   at least one data processor; and
   memory including instructions which, when executed by the at least one data processor, result in operations comprising:
      receiving data encapsulating narrative text having a plurality of words;
      removing function words from the narrative text to result in only content words;
      tagging each content word with a corresponding part-of-speech (POS) by a machine learning-based toolkit for processing of natural language text;
      filtering the content words to result in only nouns, verbs, adjective, and adverbs;
      first assigning, after the filtering, a concreteness score to each content word within a database by polling the database over a computer network to identify matching words and to use concreteness scores associated with such matching words as specified by the database;
      second assigning a uniform concreteness score for all content words corresponding to a name and not having a match in the database, the default concreteness score being a value other than zero;
      first generating concreteness scores for each of nouns, verbs, adjective, and adverbs based on the first and second assigning;
      second generating an overall concreteness score based on the first and second assigning; and
      providing data characterizing the generated concreteness scores for each of nouns, verbs, adjective, and adverbs and the overall concreteness score, the providing data comprising one or more of:
         causing the data characterizing the generated concreteness scores to be displayed in an electronic visual display, transmitting the data characterizing the generated concreteness scores to a remote computing device, loading the data characterizing the generated concreteness scores into memory, or storing the data characterizing the generated concreteness scores into physical persistence.

4. The system of claim 3, wherein the polling further comprises:
checking, using a computer-based morphological toolkit, a concreteness score for a lemma or an inflectional variant of a content word in the database if there is not an exact in the database.

5. A computer-implemented method for characterizing lexical concreteness in narrative text, the method being implemented by one or more data processors and comprising:
   receiving data encapsulating narrative text having a plurality of words for a story type;
   tagging each content word with a corresponding part-of-speech (POS) by a machine learning-based toolkit for processing of natural language text;
   removing function words from the narrative text to result in only content words;
   first assigning, after the removing, a concreteness score to each content word within a database by polling the database over a computer network to identify matching words and to use concreteness scores associated with such matching words as specified by the database;
   second assigning a uniform concreteness score for all content words corresponding to a name and not having a match in the database, the default concreteness score being a value other than zero;
   first generating concreteness scores for each of nouns, verbs, adjective, and adverbs based on the first and second assigning;
   second generating an overall concreteness score based on the first and second assigning; and
   providing data characterizing the generated concreteness scores for each of nouns, verbs, adjective, and adverbs and the overall concreteness score, the providing data comprising one or more of:
      causing the data characterizing the generated concreteness scores to be displayed in an electronic visual display, transmitting the data characterizing the generated concreteness scores to a remote computing device, loading the data characterizing the generated concreteness scores into memory, or storing the data characterizing the generated concreteness scores into physical persistence.

6. The method of claim 5, wherein the polling further comprises: checking, using a computer-based morphological toolkit, a concreteness score for a lemma or an inflectional variant of a content word in the database if there is not an exact in the database.

* * * * *